United States Patent
Burckhardt et al.

[11] Patent Number: 5,482,361
[45] Date of Patent: Jan. 9, 1996

[54] BRAKE SYSTEM WITH ADJUSTABLY VARIABLE FRONT/REAR AXLE BRAKING FORCE DISTRIBUTION

[75] Inventors: Manfred Burckhardt, Waiblingen; Sinan Kazan, Esslingen; Richard Zimmer, Fellbach, all of Germany

[73] Assignee: Mercedes-Benz AG, Germany

[21] Appl. No.: 256,248

[22] PCT Filed: Jan. 4, 1993

[86] PCT No.: PCT/EP93/00003

§ 371 Date: Oct. 31, 1994

§ 102(e) Date: Oct. 31, 1994

[87] PCT Pub. No.: WO93/12959

PCT Pub. Date: Jul. 8, 1993

[30] Foreign Application Priority Data

Jan. 3, 1992 [DE] Germany .............. 42 00 046.7

[51] Int. Cl.⁶ ............................................. B60T 8/30
[52] U.S. Cl. ................ 303/186; 303/9.71; 303/113.5; 303/182; 303/198; 364/426.02
[58] Field of Search ................. 303/9.62, 9.71, 303/9.73, 95–97, 103, 111, 113.2, 113.4, 113.5, DIG. 4, 22.1, 24.1; 364/426.01–426.03

[56] References Cited

U.S. PATENT DOCUMENTS

| | | | |
|---|---|---|---|
| 3,719,246 | 3/1973 | Bott | 303/100 |
| 4,374,421 | 2/1983 | Leiber | 303/96 X |
| 4,613,190 | 9/1986 | Johnson | 303/109 |
| 4,795,219 | 1/1989 | Brearley et al. | 303/22.1 X |
| 5,224,766 | 7/1993 | Oikawa et al. | 303/113.5 X |
| 5,302,007 | 4/1994 | Morita et al. | 303/9.73 |

FOREIGN PATENT DOCUMENTS

2156461 10/1985 United Kingdom .
2237612 5/1991 United Kingdom .

Primary Examiner—Robert J. Oberleitner
Assistant Examiner—Alfred Muratori
Attorney, Agent, or Firm—Evenson, McKeown, Edwards & Lenahan

[57] ABSTRACT

A brake system has a variable front/rear axle braking force distribution for a racing car. An electrohydraulic braking force control device with an electronic computer stage is provided in the system to take account of the aerodynamic axle load changes occurring at high speeds. This computer stage forms, from the vehicle speed and dynamically determined magnitudes, or magnitudes assumed to be appropriate, of the coefficient of friction $\mu_B$ effective at the vehicle wheels, an optimized braking force distribution factor. The brake pressure connected into the rear wheel brakes is caused to follow up the brake pressure connected into the front wheel brakes in such a way that the rear axle braking force follows the front axle braking force.

18 Claims, 6 Drawing Sheets

BRAKE SYSTEM WITH ADJUSTABLY VARIABLE FRONT/REAR AXLE BRAKING FORCE DISTRIBUTION

BACKGROUND AND SUMMARY OF THE INVENTION

The present invention relates to a brake system with an adjustably variable front/rear axle braking force distribution for a vehicle designed for high speeds, in particular a racing car, in which downward aerodynamic forces on the vehicle cause an increase in axle loads as vehicle speed increases, wherein the increase in axle load is greater at the rear axle than at the front axle, comprising front wheel brakes, rear wheel brakes, a brake unit actuatable by a brake pedal and configured to generate at least a brake pressure in the front wheel brakes and operatively associated with the front wheel brakes and the rear wheel brakes that in the event of a specified defined limiting value of the actuation force exerted by a driver of the high speed vehicle, the vehicle has a magnitude of deceleration corresponding to complete utilization of frictional force on the braked vehicle wheels.

At the high speeds of 350 km/h and more which are attained by racing cars on high-speed tracks, and given the aerodynamic shapes of the bodies for such vehicles which usually have a rear-axle drive, drastic increases in axle load occur at both the front axle and the rear axle because of the aerodynamic downward forces which increase quadratically with increasing vehicle speed. In magnitude, these increases in axle load can correspond to a multiple of the vehicle weight, for example twice or three times the stationary vehicle weight. For the designs possible, it is found that with increasing vehicle speed $\underline{v}$, the aerodynamic downward forces effective at the rear axle increase more strongly than the aerodynamic downward forces effective at the front axle. This, however, leads to the fact that a brake system, such as one designed for a fixed matching of the braking force distribution, can only be designed in an optimum manner for a narrow speed range and, outside this speed range, is associated with either the danger of unstable dynamic braking behaviour of the vehicle or the disadvantage of a relatively low braking deceleration for a specified actuating force.

This disadvantage can indeed be ameliorated by an anti-lock brake system (ABS) which operates with a speed-dependent change to the response threshold both at the front axle and at the rear axle as discussed in DE 39 35 834 C2. Because, however, the brake system must be basically matched for stable braking behaviour without the influence of the aerodynamic forces, so that the brake coefficient $B^*_H$ of the rear axle must of necessity be kept relatively low, a disproportionately large increase in pressure is necessary at the front axle when the anti-lock brake system responds in the high speed range in order to enforce a response of the control system at the rear wheel brakes also. However, the expenditure of force necessary for such an increase in pressure, on the one hand, and the time that elapses before the build-up of pressure is achieved limit the effectiveness of an anti-lock braking system for racing duties and lead, as a result, to time delays in the build-up of brake pressure which lead, as a result, to unacceptable losses of time when racing.

On the other hand, twin main cylinders are also used in racing cars in which "single circuit" main cylinders associated with the front wheel brakes and the rear wheel brakes are actuated by a rocker with a variable point of action of the force, the most favorable positional setting of the point of action of the force being different for each speed. In combination with twin main cylinders, automatically operating adjustment appliances for the point of action of the force on the rocker are also known which would, in principle, also permit a speed-dependent variation in the braking force distribution. Such adjustment appliances, however, have the disadvantage that very high forces act in braking operation on the linkage piece marking the point of action so that the adjustability is necessarily associated with hysteresis and substantial adjustment times have to be accepted, with the result that an exact setting of the optimum braking force distribution is practically impossible. For this reason, in fact, automatically operating adjusting devices of the type described have not previously been employed in racing and only those which can be set "by hand" to the statistically most important situation have been used.

An object of the present invention is, therefore, to improve a brake system such that it permits rapid setting, to meet the requirements, of an optimized braking force distribution with, at the same time, a simple functionally reliable construction suitable for use in a racing vehicle.

This object has been achieved in accordance with the present invention in that in addition to a brake unit, a further brake pressure source is provided whose outlet pressure is electronically controllable so that over the complete speed range which has to be considered, there is a distribution corresponding to the ideal or almost to the ideal braking force distribution of the braking forces which can be exerted by the front wheel brakes and the rear wheel brakes and, referred to the actuating force which the driver has to apply during a braking operation, the maximum possible vehicle deceleration. The algorithm employed, according to the present invention, for controlling the outlet pressure of the additional brake pressure source is based on the condition of equality of the wheel lock limits at the front wheels and the rear wheels and corresponds to an approximate numerical evaluation of this relationship. This algorithm can be evaluated very rapidly electronically and a rapid follow-up of the rear axle brake pressure in relation to the front axle brake pressure, taking account of the respective vehicle speed, is therefore also possible. The connection of the outlet pressure of the brake pressure source into the rear wheel brake caliper piston pairs to be acted upon by this outlet pressure is possible with simple structural features without a complicated brake unit being necessary for this purpose. This applies particularly where the rear wheel brakes are acted upon exclusively by the outlet pressure of the controllable pressure source, in which case it is only the brake pressure to be connected to the front wheel brakes which must be generated by the brake unit, which can therefore be configured as a simple "single circuit" main cylinder and also, if appropriate, as a tandem main cylinder to each of whose outlet pressure spaces is connected one of the front wheel brakes.

In an embodiment of the brake system of the present invention in which the rear wheel brakes have four-piston calipers with the outlet pressure of the controllable brake pressure source, respectively connected to only one of these piston pairs, the additional brake pressure source can be configured for a lower outlet pressure level, and increased safety relative to a failure of the additional pressure source is also provided because the rear wheel brake caliper piston pair, which is acted on by brake pressure by the brake unit, remains functional even in the case of a failure of the additional brake pressure source.

With the aid of a tandem-main cylinder modified to have a control pressure space which, when it is acted on by the outlet pressure of the controllable pressure source, permits the attainment of the development of brake pressure in the rear wheel brakes relative to the brake pressure in the front wheel brakes corresponding to the optimized braking force distribution an advantageous simple conduit routing for the brake conduits necessary for the front wheel brakes and the rear wheel brakes is achieved and permits an arbitrary configuration of the brake calipers.

In combination with this, a simple configuration of the tandem main cylinder with a control pressure space is provided, in one embodiment of which a reaction of the control pressure employed for pressure modulation of the rear axle brake pressure on the front axle brake circuit is avoided.

The brake system configuration provided in accordance with an embodiment of the present invention advantageously ensures that the vehicle can be braked in a dynamically stable manner even in the case of a failure of the additional brake pressure or control pressure source.

Further features of the present invention provide embodiments of the controllable pressure source which permit, by simple technical control techniques, sensitive continuous or quasi-continuous setting or follow-up of the brake pressure connected into the rear wheel brakes.

Knowledge of the braking force developed by the front wheel brakes is necessary for the appropriate control of the braking force to be developed by the rear wheel brakes. This knowledge can be gained in a simple manner by a pressure pick-up associated with the front axle brake circuit or a position pick-up recording the position of the brake pedal. The pressure pick-up has the advantage that the measured parameters of interest can be more accurately determined but it requires an additional seal location in the hydraulic conduit system whereas the position pick-up can be arranged "outside" the conduit system and therefore provides the advantage of less susceptibility to fault of the brake system.

A pressure pick-up is present for recording the actual value of the pressure connected into the rear wheel brakes, with the pressure pick-up being expediently connected directly at the pressure outlet of the controllable pressure source. In such embodiment, the rear axle braking force can follow up the front axle braking force in the relationship provided so as to provide a follow-up control with particularly good maintenance of the most favorable braking force distribution ratio.

Knowledge of the magnitude of the friction coefficient $\mu_B$ currently effective between the roadway and the braked vehicle wheels is desirable for optimized braking force distribution control. This knowledge can be gained in a simple manner from the dynamic acceleration behavior of the vehicle and/or from the deceleration behavior of the vehicle when the anti-lock control is effective during a braking operation on all the vehicle wheels. For these two ways of recording the friction coefficient, it is advantageous for the vehicle to be equipped with a longitudinal acceleration sensor which generates electrical output signals characteristic of the accelerations and/or decelerations occurring on the vehicle, which output signals can be employed for calculating the required value of the currently most favorable braking force distribution.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
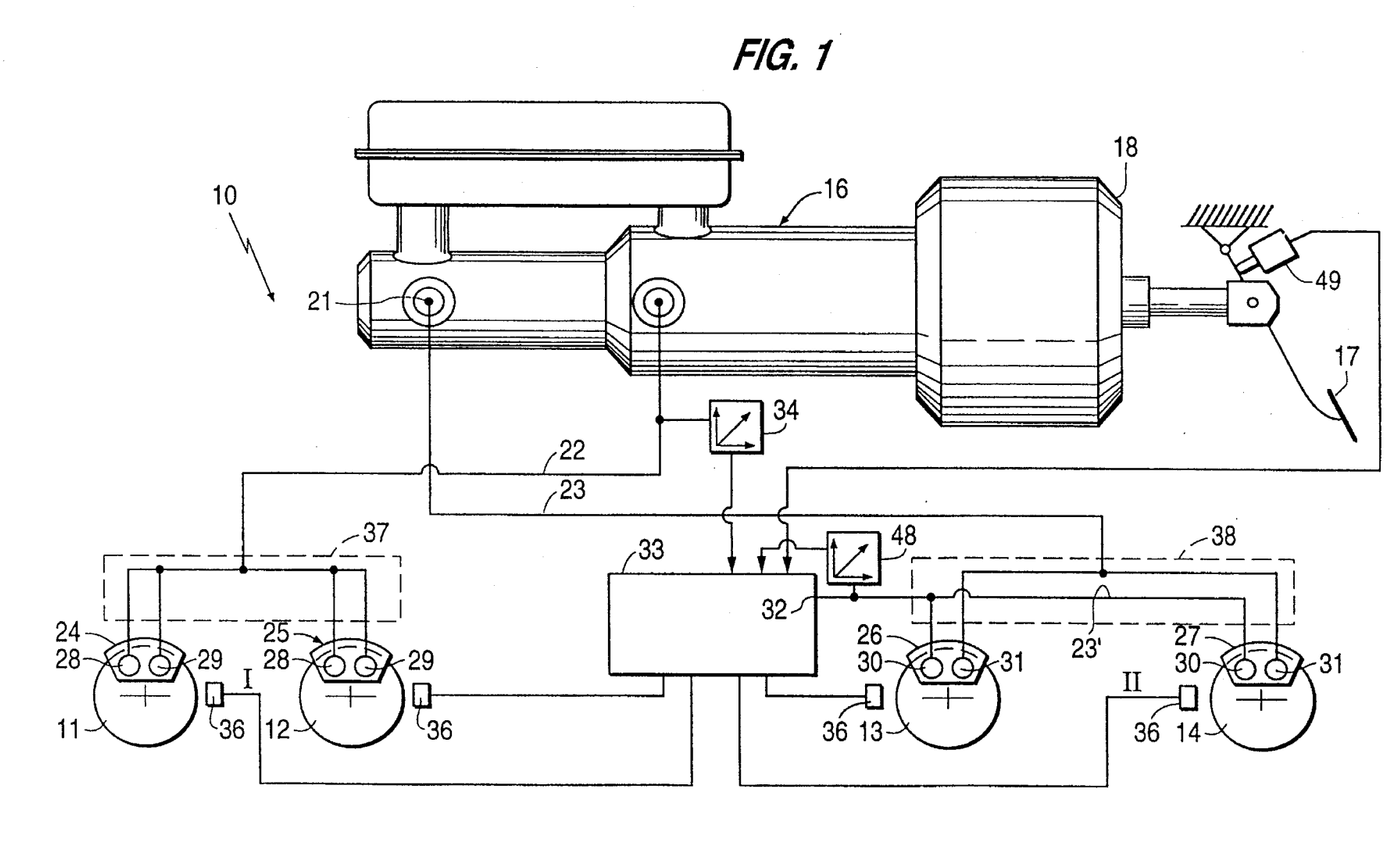
FIG. 1 is a schematic diagram of a first embodiment of a brake system, according to the present invention, with an electronically controllable pressure source for achieving an optimized front/rear axle braking force distribution.

The hydraulic twin-circuit brake system shown in FIG. 1 and designated generally by numeral 10 represents a road vehicle which is designed for extremely high speeds of markedly above 300 km/h and which can be also braked with very high vehicle decelerations. In particular, such a vehicle can be a racing car whose aerodynamic design results in a marked increase in both the front axle load and the rear axle load at high speeds, it being desirable to employ these increases in axle load as effectively as possible to achieve the highest possible vehicle decelerations during a braking procedure.

In the brake system 10, the front wheel brakes 11 and 12 are combined to provide a front axle brake circuit I and the rear wheel brakes 13 and 14 are combined to provide a rear axle brake circuit II.

A conventional tandem main cylinder, which can be actuated by a brake pedal 17 via a braking force amplifier 18 which can be configured as a hydraulic or as a pneumatic braking force amplifier, is provided as the brake unit 16 of the brake system 10. This tandem main cylinder has a pressure outlet 19 associated with the front axle brake circuit I and a pressure outlet 21 associated with the rear axle brake circuit II, to which are connected main brake conduits 22 and 23, respectively, which branch to the front wheel brakes 11, 12 and the rear wheel brakes 13, 14, respectively. By way of these main brake conduits 22 and 23, outlet pressures generated in a primary outlet pressure space and a secondary outlet pressure space of the tandem main cylinder 16, by the actuation of the latter, can be connected into the front wheel brakes 11 and 12 and the rear wheel brakes 13 and 14 as brake pressures.

With respect to the front wheel brakes 11 and 12 and the rear wheel brakes 13 and 14, which are respectively configured as disc brakes, it is assumed that their brake calipers 24, 25 and 26, 27 are configured as so-called four-piston calipers which each have two piston pairs 28, 29 and 30, 31. The brake calipers 24 and 25 of the front wheel brakes 11 and 12 are of mutually identical design and the brake calipers 26 and 27, respectively, also have the same design; the piston pairs 28 and 29 of the brake calipers 24 and 25 of the front wheel brakes and the piston pairs 30 and 31 of the brake calipers 26 and 27 are, however, differently dimensioned.

In contrast to the front axle brake circuit I, in which all the piston pairs 28 and 29 of the brake calipers 24 and 25 of the front wheel brakes 11 and 12 are connected to the main brake conduit 22 of the front axle brake circuit I and are, therefore, acted on with the same brake pressure delivered at the pressure outlet 19 of the brake unit 16 during an actuation of the brake system 10, only one of the piston pairs, for example the piston pair 31, of the brake calipers 26 and 27 of the two rear wheel brakes 13 and 14 is connected in each case to the main brake conduit 23, of the rear axle brake circuit I which starts from the pressure outlet 21 of the brake unit 16. The two other piston pairs 30 of the brake calipers 26 and 27 of the rear wheel brakes 13 and 14 are jointly connected to the pressure outlet 32 of an electronically controllable brake pressure source 33 and can be acted on by that outlet pressure of this additional brake pressure source 33 which is controlled relative to the brake pressure $p_V$ connected into the front wheel brakes 11 and 12. For the monitoring of the pressure $p_V$, an electromechanical or electronic pressure pick-up 34 is provided which generates an output signal proportional to the brake pressure delivered at the pressure outlet 19 of the brake unit 16. This output signal is fed to an electronic control unit (not shown by itself) of the brake pressure source 33, as a function of the vehicle speed v in such a way that a favorable front/rear axle braking force distribution is produced with respect to the achievability of the highest possible vehicle decelerations at a specified pedal actuation force. This front/rear axle braking force distribution approximates at least very well to that ideal braking force distribution which corresponds to equal utilization of the friction force at the front wheels and the rear wheels of the vehicle.

In the illustrated embodiment, output signals of the wheel rotational speed sensors 36 individually associated with the vehicle wheels are employed to determine the precise value of the vehicle speed v. These wheel rotational speed sensors 36 are provided as part of an anti-lock brake system with which the vehicle is likewise equipped to determine the wheel peripheral speeds. The brake slip and the wheel decelerations can also be determined from the comparative and differential processing of these wheel peripheral speeds.

This otherwise conventional anti-lock brake system, which can operate on the pump-back principle, is only substantially represented in FIG. 1 by hydraulic brake pressure control units 37 and 38 associated with the front axle brake circuit I and the rear axle brake circuit II, respectively. These conventional brake pressure control units 37 and 38 contain, in turn, brake pressure control valves associated individually or jointly with the front wheel brakes 11, 12 and the rear wheel brakes 13, 14.

The front wheel brake calipers 24 and 25 have piston pairs 28 and 29 which are jointly acted upon by the brake pressure $p_V$ delivered at the primary pressure outlet 19 of the brake unit 16. The piston pairs 31 of the rear wheel brakes are jointly acted upon by the outlet pressure $p_H$ delivered at the secondary outlet pressure outlet 21 of the brake unit 16. The piston pairs 28, 29, and 31 are configured such that the resulting rear/front axle braking force distribution provides a dynamically stable deceleration of the vehicle over the complete range of vehicle accelerations of interest and up to the critical braking ratio $Z_{crit}$. During a braking operation, the wheels always reach the wheel lock limit "before" the rear wheels whereas, during a critical braking operation in which the same employment of friction force is provided at the front wheels and the rear wheels, the wheels lock simultaneously. Stable braking behavior of a vehicle over the complete braking range, i.e. partial braking range and full braking range, is therefore achieved when, as is usual, the critical braking ratio is selected to be equal to the highest possible friction coefficient $\mu_B$ which can be employed in accordance with the properties of the vehicle under the roadway conditions—dry roadway with good grip—so that:

$$Z_{krit} = \mu_B \tag{1}$$

On the other hand, the relationship below applies generally to critical braking ratio:

$$Z_{krit} = \frac{\psi - \phi}{\chi} \tag{2}$$

where $\psi$ designates the rear axle load proportion, $\phi$ designates the rear axle braking force proportion and $\chi$ represents the height of the center of gravity in relation to the wheel base, which is satisfied in turn by the relationship $$\chi = h/l$$

in which h is the height of the center of gravity of the vehicle and l is the distance between its axles.

Neglecting aerodynamic effects, the relationship below for the rear axle braking force proportion $\phi$ follows directly from the relationship (2)

$$\phi = \psi - Z_{krit}\chi = \psi - \mu_B\chi \tag{3}$$

From Burkhardt/Burg ("Berechnung und Rekonstruktion des Bremsverhaltens von PKW", Page 75, Verlag Information Ambs GmbH, 1988), the following relationships apply to the wheel lock point $Z_{blv}^*$ at the front axle and the wheel lock point $Z_{blh}^*$ at the rear axle under the influence of the aerodynamic upward and downward forces:

$$Z_{blv}^* = \frac{\mu_B \times [1 - \psi - (K_{a,v}/G_g) \times v^2]}{1 - \mu_{Bv} \times \chi - \phi} \tag{4}$$

$$Z_{blh}^* = \frac{\mu_B \times [\psi - (K_{a,h}/G_g) \times v^2]}{\mu_{Bh} \times \chi + \phi} \tag{5}$$

In these relationships (4) and (5), $G_g$ designates the total vehicle weight whereas $K_{a,v}$ and $K_{a,h}$ designate the coefficients for the aerodynamic forces acting as upward or downward forces, depending on the design of the body, which vary with the square of the vehicle speed v.

On the assumption that optimum braking of a vehicle is provided when:

$$Z_{blv} = Z^*_{blh} \tag{6}$$

i.e. the wheel lock limit $Z_{blv}$ at the front axle is equal to that at the rear axle then, with the auxiliary condition that $$\mu_{B,v} = \mu_{B,h} = \mu_B \tag{7}$$

i.e. the friction coefficients which can be employed at the front and rear axles of the vehicles are equal, the following equation determining an optimum rear axle braking force proportion $\phi_{om}$, taking account of the aerodynamic forces, is obtained from the relationships (4) and (5):

$$\frac{1 - \psi - K_{a,v} \times v^2/G_g}{1 - \mu_B \times \chi - \phi_{om}} = \frac{\psi - K_{a,h} \times v^2/G_g}{\mu_B \times \chi + \phi_{om}} \tag{8}$$

The relationship below for the optimum rear axle braking force proportion phi$_{om}$ follows from this relationship (8)

$$\phi_{om} = \frac{\psi - K_{a,h} \times v^2/G_g - \mu_B \times \chi \times [1 - v^2 \times (K_{a,v} + K_{a,h})/G_g]}{1 - v^2 \times (K_{a,v} + K_{a,h})/G_g} \quad (9)$$

For the braking force distribution factor DB, which is generally given by the relationship $$DB = F_{B,h}/F_{B,v} \phi/(1-\phi) \quad (10a)$$

in which $FB_{B,h}$ designates the rear axle braking force and $FB_{B,v}$ designates the front axle braking force, the relationship (9) gives the relationship:

$$DB_{om} \phi_{om}/(1-\phi_{om}) \quad (10)$$

as the optimum value $DB_{om}$ of the braking force distribution factor.

For a vehicle with the following data:

| | | |
|---|---|---|
| $\psi = 0.6$ | $\chi = 0.141$ | $G_g = 7800\,N$ |
| $K_{a,v} = -0.712$ | $K_{a,h} = -1.688$ | | an evaluation of the relationship (9) for the optimum rear axle braking force proportion $\phi_{om}$ for various values of the vehicle speed and various values of the friction coefficient $\mu_B$, gives the result that a very good approximation to the optimum rear axle braking force proportion can be provided by the following relationship:

$$\phi_{om} = 0,46 - 0,141(\mu_B - 1) + g \cdot 10^{-4} \cdot v \quad (11)$$

The corresponding relationship, for the optimum braking force distribution factor $DB_{om}$, resulting from the relationship (10) is:

$$DB_{om} = 0,85 - 0,42(\mu_B - 1) + 0,0032 \cdot v \quad (12)$$

Figure 2A:
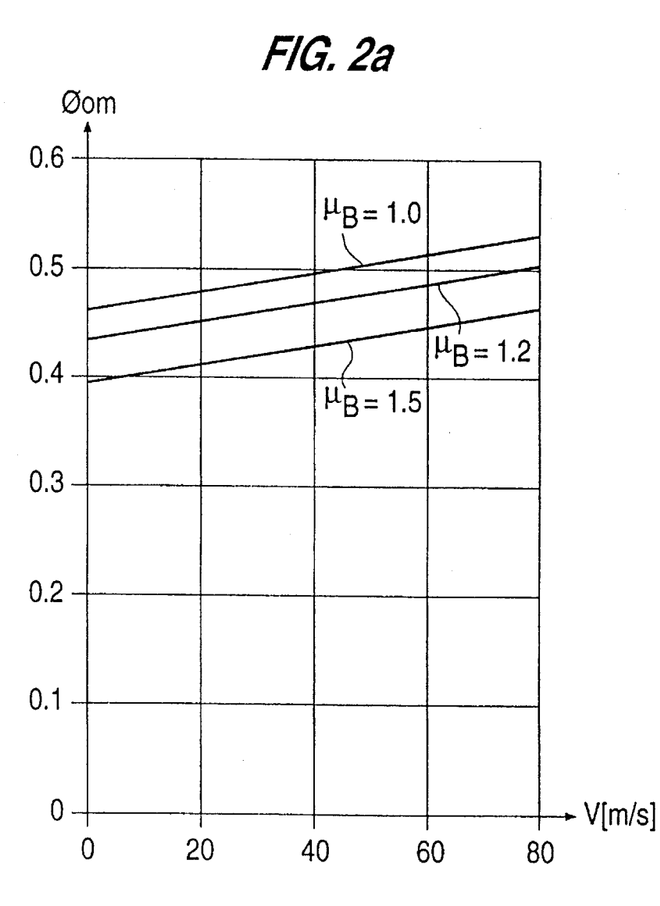
FIG. 2a and 2b are diagrams for explaining the function of the brake system of FIG. 1, FIG. 3a and 3b are schematic diagrams of alternative electronically controllable pressure sources for use in the brake system of FIG. 1.
Figure 2B:
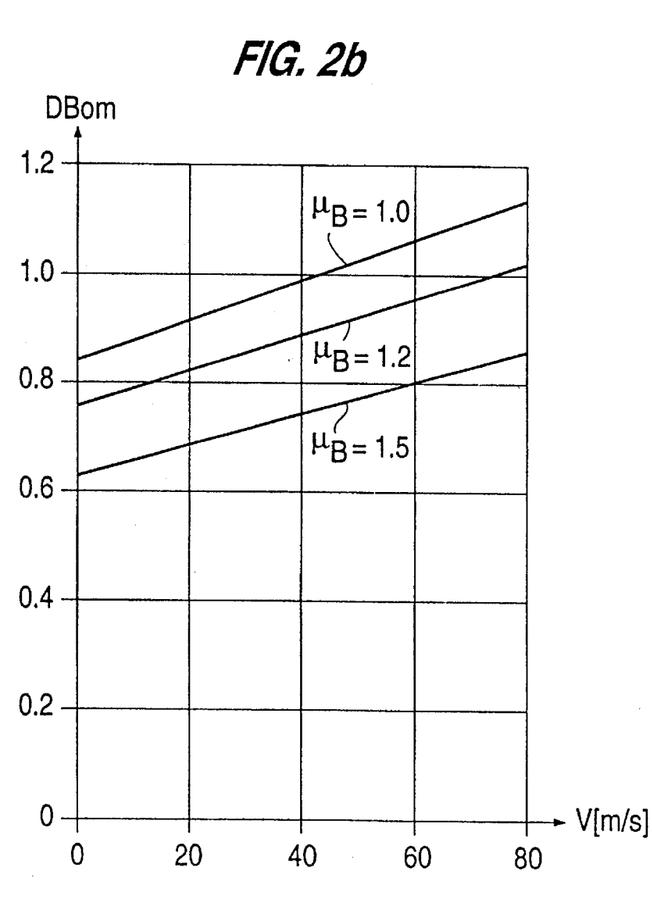

The way in which the optimum rear axle braking force proportion $\phi_{om}$ and the optimum braking force distribution factor $DB_{om}$ vary with speed in accordance with the relationships (11) and (12) are shown in FIG. 2a and 2b with the friction coefficients $\mu_B = 1$; 1.2 and 1.5 as parameters.

In order to explain a typical design example of the brake system 10 shown in FIG. 1, it is assumed that the vehicle is designed in such a way that the downward aerodynamic force at the rear axle is greater than that at the front axle. In this design, the minimum value $DB_{om,min}$ of the optimum braking force distribution factor $DB_{om}$ is given by that value which can be achieved, in the absence of the velocity-dependent downward aerodynamic forces, by employing the maximum friction coefficient $\mu_B$.

The piston areas $A_{h1}$ of the piston pair 31, which areas are acted on by the outlet pressure $P_H$ provided at the rear axle brake pressure outlet 21 of the brake unit 16 when it is actuated, is chosen relative to the effective piston areas $A_v$ of the two piston pairs 28 and 29 of the two front wheel brakes 11 and 12, which latter areas are acted on by the outlet pressure $p_V$ provided at the front axle brake pressure outlet 19 of the brake unit 16 during a braking operation (which outlet pressure $p_V$ is equal to the outlet pressure $p_h$ delivered at the rear axle brake pressure outlet 21, corresponding to the configuration of the brake unit 16 as a conventional tandem main cylinder), are chosen in such a way that the minimum value $DB_{om,min}$ of the optimum braking force distribution factor $DB_{om}$ is provided without the added action of the downward aerodynamic forces and that, therefore, the following relationship applies to the minimum value of the braking force distribution factor:

$$DB_{om,min} = \frac{r_{dyn,v} \times r_{med,h} \times C_h^* \times A_{h1}}{r_{dyn,h} \times r_{med,v} \times C_v^* \times A_v} \quad (13)$$

from which the relationship for the piston area $A_{h1}$ follows directly:

$$A_{h1} = \frac{r_{dyn,h} \times r_{med,v} \times C_v^* \times DB_{om,nim} \times A_v}{r_{dyn,v} \times r_{med,h} \times C_h^*} \quad (14)$$

In the relationships (13) and (14), $r_{dyn,v}$ designates the dynamic rolling radius of the front wheels, $r_{dyn,h}$ designates the dynamic rolling radius of the rear wheels, $r_{med,v}$ designates the average friction radius of the front wheel brakes, $r_{med,h}$ designates the average friction radius of the rear wheel brakes and $C^*_v$ and $C^*_h$ respectively designate the dimensionless brake coefficient of the front wheel brakes and the rear wheel brakes, referred to the clamping force, which brake coefficient corresponds to twice the operational friction coefficient of the brake linings in the case of friction brakes.

Including the piston pairs 30, which are additionally provided as part of the brake calipers 26 and 27 of the rear wheel brakes 13 and 14, which are connected to the pressure outlet 32 of the electronically controllable, additional brake pressure source 33 and which have to produce a relatively increased rear axle braking force proportion due to the speed effect and due to a smaller friction coefficient between the roadway and the braked vehicle wheels, the following relationship applies for the optimum braking force distribution factor $DB_{om}$ if the piston areas of the further piston pairs 30 are designated by $A_{h2}$ and if the brake pressure generated as a function of speed by the additional brake pressure source 33 is designated by $P_{h2}$:

$$DB_{om} = \frac{A_{h1} \times p_v + A_{h2} \times P_{h2}) \times r_{dyn,v} \times r_{med,h} \times C_h^*}{A_v \times p_v \times r_{dyn,h} \times r_{med,v} \times C_v^*} \quad (15)$$

from which it follows directly that:

$$A_{h2} \times p_{h2} = \left( DB_{om} \times \frac{r_{dyn,h} \times r_{med,v} \times C_v^* \times A_v}{r_{dyn,v} \times r_{med,h} \times C_h^*} - A_{h1} \right) \times p_v \quad (16)$$

If the following exemplary values are assumed:

$r_{dyn,v} = 31$ cm $r_{med,v} = 15.17$ cm $C_v^* = 0.7$ $A_v = 25.19$ cm$^2$ (corresponding to piston diameters of 38 and 42 mm respectively of the piston pairs 29 and 28 of the brake calipers 24 and 25 of the front wheel brakes 11 and 12)

$r_{dyn,h} = 35.5$ cm (corresponding to a larger diameter of the rear wheels of the racing vehicle)

$r_{med,h} = 15.17$ cm (equal brake discs on the front wheel and rear wheel brakes) and $C^*_h = 0.7$ and if a value of 0.64 is assumed for the smallest optimum braking force distribution factor which appears for a friction coefficient $\mu_B$ of 1.5 from the relationship (12) for v=0, it follows from the relationship (14) that the area $A_{h1}$ of the piston pairs 31 of the brake calipers 26 and 27 of the rear wheel brakes 13 and 14 acted by the outlet pressure $p_h$ (=$p_v$) produced at the rear axle brake pressure outlet 21 of the brake unit 16 has a value of 18.46 cm$^2$, which corresponds to a piston diameter of 4.85 cm. If, instead, the standard diameter of 48 mm is chosen, a value of 18.10 cm$^2$ appears for the area $A_{h1}$ of the pistons of those piston pairs 31 which are directly connected to the rear axle brake pressure outlet 21 of the brake unit 16.

If a standard size with a diameter of 35 mm, which corresponds to a piston area $A_{h2}$ of 11.34 cm², is chosen for the pistons of the piston pairs of the brake calipers 26 and 27 of the rear wheel brakes 13 and 14 connected to the electronically controllable brake pressure source 33 an evaluation of the relationship (16), taking account of the relationship (12) for the optimum braking force distribution factor gives the following relationship if the value of 1.5 is used for the friction force coefficient µB and the value of 60 m/s is used for the vehicle speed $\underline{v}$:

$$P_{h2} = 0{,}52 \cdot p_v \tag{16'}$$

Under the assumption made for the derivation of the relationship (9) that: $Z^*_{blv} = Z^*_{blh}$, the following relationship also applies to the maximum braking ratio Z* of the vehicle, with the inclusion of the downward aerodynamic forces but without the additionally effective aerodynamic drag, as does the following relationship, employing for example the relationship (4)

$$Z^* = \frac{\mu_B[1 - \psi - k_{a,v} \times v^2/G_g]}{1 - \mu_B \times \chi - \phi_{om}} \tag{4'}$$

the value of the optimum rear axle braking force proportion $\phi_{om}$ resulting from the relationship (11) being given by $$\phi_{om} = 0{,}444 \tag{12'}$$

the maximum braking ratio of the vehicle for the totality of the given data being given by:

$$Z^* = 3{,}17 \tag{4''}$$

The following relationships therefore appear for the brake coefficients in relation to pressure for the front axle and the rear axle, respectively $$B_v^* = (2/r_{dyn,v}) \cdot A_v \cdot r_{med,v} \cdot C_v^* = 17{,}26 \text{ cm}^2 \tag{17}$$

and $$B^{*(2/r_{dyn,h})}_{h=14,36cm^2} \cdot A_{h1} + (p_{h2}/p_{h,v}) \cdot A_{h2}) \cdot r_{med,h} \cdot C_h^* \tag{18}$$

and for the complete vehicle, therefore, the relationship $$B^* = B^*_v + B^*_h = 31{,}62 \text{ cm}^2 \tag{19}$$

The following expression applies to the front axle brake pressure $p_v$ effective in both the piston pairs 28 and of the front wheel brakes and the piston pairs 31 of the brake calipers 26 and 27 of the rear wheel brakes 13 and 14 connected to the rear axle brake pressure outlet 21 of the brake unit 16:

$$p_v = Z^* \times \frac{G_g}{B^*} = 782{,}6 N/cm^2$$

and, in view of the relationship (16'):

$$p_{h2} = 0{,}52 p_{h1} 0{,}52 p_v = 407 N/cm^2 \tag{16''}$$

so that all the values of interest have been determined.

The relationships (15), (16), (16') together with (17), (18), (20) and (16'') also apply to the case where the brake calipers of the front wheel brakes are configured as twin-piston calipers whose pistons have average cross-sectional areas which correspond to the sum of the areas of the pistons of the individual piston pairs 28 and 29. Instead of four piston calipers 26 and 27 in the case of the rear wheel brakes 13 and 14, respectively, separated calipers can be provided such that two are connected to the rear axle brake pressure outlet 21 of the brake unit (16) and two are connected to the pressure outlet 32 of the electronically controllable brake pressure source 33.

Figure 3A:
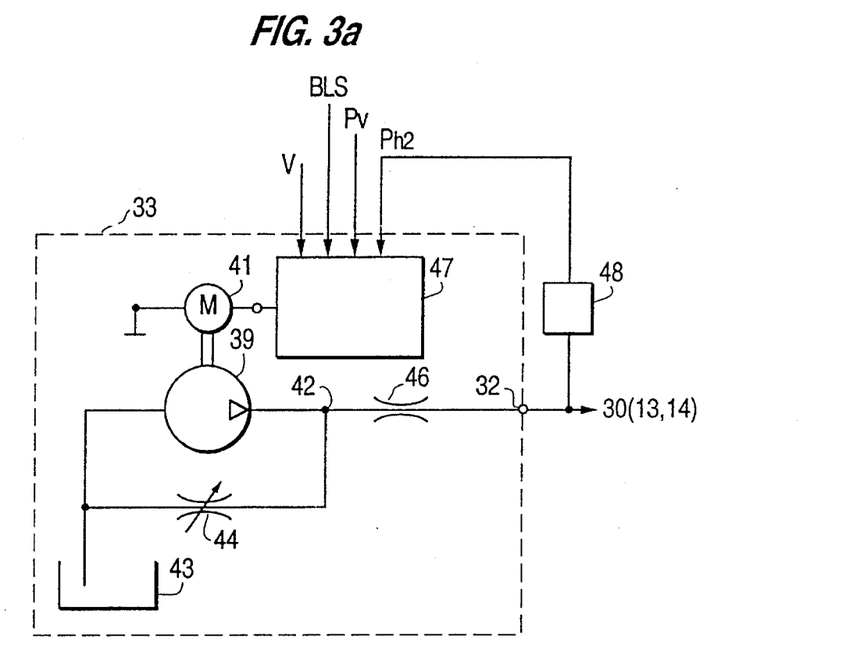

In order to explain one embodiment of the electronically controllable brake pressure source provided for setting the rear axle braking force as a function of speed, reference is now made to FIG. 3a which shows a brake pressure source 33 in which the outlet pressure can be varied by varying the rotational speed of a pump 39, it being assumed that the volume flow delivered by the pump 39 is proportional to the rotational speed.

An electric motor 41 with a controlled, variable rotational speed is provided for driving the pump 39, for example a servomotor with a rotational speed proportional to the level of the supply voltage or a pulse-controlled motor with a rotational speed proportional to the frequency of the activation pulses such as, for example, an AC motor.

A throttle 44 with all adjustable flow resistance, by way of whose setting the outlet pressure level at which the controllable brake pressure source 33 operates at a certain motor rotational speed can be specified, is connected between the pressure outlet 42 of the pump 39, which is configured as a high pressure pump with an outlet pressure level of approximately 100 bar, and the unpressurized reservoir 43 (i.e. a reservoir kept to the pressure of the surrounding atmosphere) of the brake pressure source 33. This reservoir can simultaneously be the brake fluid reservoir of the brake system 10. A fixed throttle 46, by way of which "smoothing"—reduction of the pressure fluctuations—of the outlet pressure provided at the pressure outlet 32 of the brake pressure source is achieved, is connected between the pressure outlet 42 of the pump 39 and the pressure outlet 32 of the brake pressure source 33.

An electronic control unit 47 is provided for controlling the rotational speed of the drive motor 41 of the pump 39. This control unit 47 is explained below essentially in functional terms, from knowledge of which an appropriately trained specialist can readily realize the control unit 47 with available electronic circuit technology. It is, therefore, possible to dispense with an explanation of technical circuit details. During a braking operation, the electronic control unit 47 continually processes the input data on-line. The data include at least the information on the instantaneous value of the vehicle speed, the brake pressure $p_v$ which acts on the front wheel brakes 11 and 12 and the actual value of the outlet pressure delivered at the outlet 32 of the controllable brake pressure source 33. It produces, as a result, an evaluation of the relationship (16), taking account of the optimum braking force distribution factor $DB_{om}$ determined in accordance with the relationship (12), and therefrom generates output signals suitable for activating the drive motor 41 of the pump 39. Via the output signals, the pump 39 is operated in each case with a delivery such that, at least to a very good approximation, the optimum rear axle braking force proportion $\phi_{om}$ required by the relationship (9) for a specified configuration of the brake system 10, i.e. an at least approximately ideal braking force distribution with respect to equal employment of frictional force at the front and rear wheels of the vehicle is produced without an exact evaluation of the relationship (9) being necessary for this purpose.

A pressure pick-up 48 provided for recording the outlet pressure of the electronically controllable brake pressure source 33 is connected in the embodiment example of FIG. 1 to the pressure supply conduit 23' branching to the piston pairs 30 of the brake calipers 26 and 27 of the rear wheel brakes, which piston pairs are acted on by the outlet pressure of the controllable brake pressure source 33. Its output signal is therefore a measure of a pressure, i.e. the direct outlet pressure of the brake pressure source 33, which is slightly higher than the pressure actually connected into the piston pair 30. This can, however, be taken into account by calculation in the electronic control unit 47 which is expediently activated by the brake light switch 49 output signal occurring on actuation of the brake pedal 17. It is only after this activation that the drive motor 41 starts. In the embodiment shown in FIG. 3b of an electronically controllable brake pressure source 33 suitable as part of the brake system 10 of FIG. 1, the drive motor 41 of the pump 39, and therewith the pump 39, are permanently driven or switched on before braking takes place, for example whenever the driver takes his foot off the acceleration pedal. In this case also, the drive motor 41 is switched on for safety reasons, at the latest with the appearance of the brake light switch output signal. Switching off the drive motor 41 with the ending of the braking operation is also unnecessary. In principle, the pump drive can itself be derived from the vehicle engine, as is also the case for the supply pumps of, for example, a hydraulic level control.

Figure 3B:
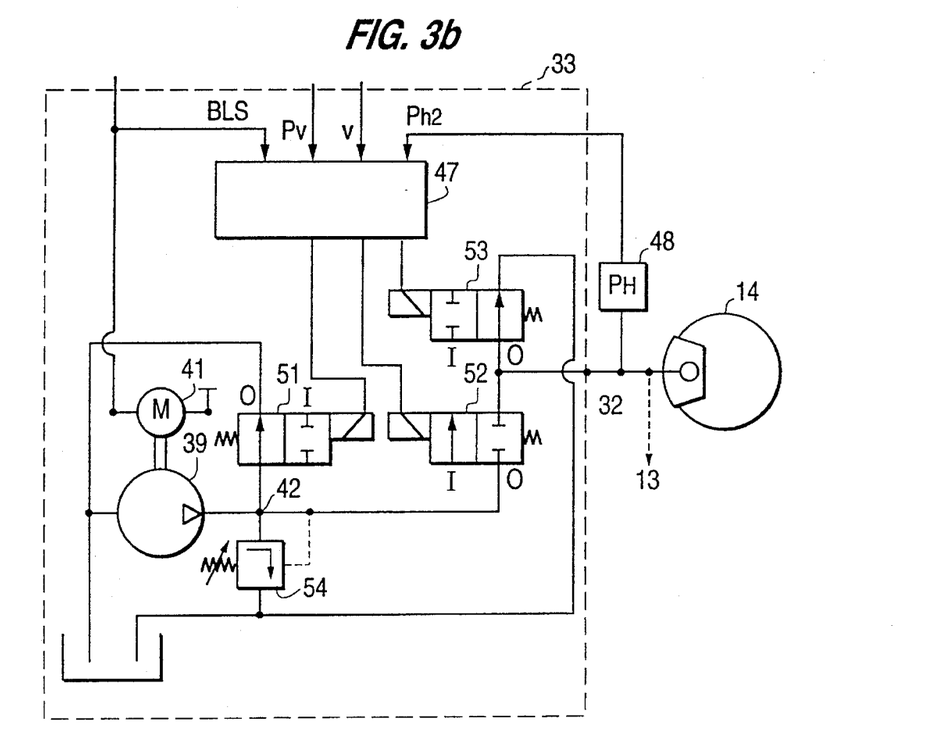

In the controllable brake pressure source 33 of FIG. 3b, a pump 39 is operated at substantially constant rotational speed, and therefore with constant delivery, at least during a braking operation. So that the pump 39 can have substantially load-free short-circuit operation, if necessary, a recirculation and pressure build-up control valve 51 configured as a 2/2-way magnetic valve is connected between the high pressure outlet 42 of the pump 39 and the reservoir 43. The basic position 0 of this control valve 51 is its through-flow position in which the pump 39 is short-circuited. In the excited position I of this control valve 51, the pressure outlet 42 of the pump 39 is shut off from the reservoir 43. Furthermore, a pressure delivery control valve 52, likewise configured as a 2/2-way magnetic valve, is connected between the pressure outlet 42 of the pump 39 and the pressure outlet 32 of the brake pressure source 33. The basic position 0 of this pressure delivery control valve 52 is its shut-off position in which the pressure outlet 32 of the brake pressure source 33 is shut off from the pressure outlet 42 of the pump 39 and its excited position I is a through-flow position in which the pressure outlet 42 of the pump 39 is connected to the pressure outlet 32 of the brake pressure source 33 and a hydraulic consumption unit connected to the pressure outlet 32 can be acted on by pressure. A further 2/2-way magnetic valve 53 is connected between the pressure outlet 32 of the controllable brake pressure source 33 and its reservoir 43. This 2/2-way magnetic valve 53 can be used as a brake pressure reduction valve via which a wheel brake which can be acted on by pressure via the pressure outlet 32 can be again relieved of pressure to the reservoir 43 of the brake pressure source 33. The basic position 0 of this 2/2-way magnetic valve is its through-flow position in which brake fluid from a wheel brake connected to the pressure outlet 32 of the brake pressure source 33 can flow back to the reservoir 43. Its excited position I is the shut-off position in which, if the pressure supply control valve 52 is in its excited position I, brake pressure is built up in a connected wheel brake or, if this brake supply control valve 52 is in its basic position 0, the pressure at the pressure outlet 32 of the controllable brake pressure source 33, and therefore also the pressure in a consumption unit connected to it is held at a constant level.

Furthermore, a pressure limiting valve 54 is connected between the pressure outlet 42 and the reservoir 43 of the controllable brake pressure source 33. If both the recirculation control valve 51 and the supply control valve 52 take up their shut-off positions, brake fluid can flow away via the pressure limiting valve 54 from the high pressure outlet 42 of the pump 39 to the reservoir 43 as soon as the outlet pressure of the pump 39 exceeds a settable threshold value.

The same functions as those which can be achieved by the electronically controllable brake pressure source, explained comprehensively by way of FIG. 3a, can be achieved by the electronically controllable brake pressure source 33 of FIG. 3b.

A pressure build-up phase at the pressure outlet 32 of the brake pressure source 33, which can be controlled in the case of the brake pressure source 33 of FIG. 3a by increasing the rotational speed of the drive motor 41 of the pump 39, can be achieved in the case of the brake pressure source 33 of FIG. 3b by driving the recirculation control valve 51 into its shut-off position I, the supply control valve 52 into its through-flow position I and the pressure reduction control valve 53 into its shut-off position I at constant rotational speed of the drive motor 41 and, therefore, at a constant delivery from the pump 39.

A phase of constant outlet pressure from the brake pressure sources 33 is achieved, in the case of the variant of FIG. 3a, by keeping the rotational speed of the drive motor 41 of the pump 39 constant. In the case of the embodiment of FIG. 3b, a phase in which the outlet pressure of the controllable brake pressure source 33 is held constant is achieved by driving the supply control valve 52 and the pressure reduction control valve 53 into their shut-off positions, i.e. the supply control valve 52 takes up its basic position 0 whereas the pressure control valve is driven into its—shut-off—excited position I. The outlet pressure of the controllable brake pressure source 33 of FIG. 3b is then kept constant independently of whether the circulation control valve 51 takes up its basic position 0 or its excited position I. A pressure reduction phase at the pressure outlet 32 of the controllable brake pressure source of FIG. 3a is achieved by reducing the rotational speed of the drive motor 41. In the case of the variant of the controllable brake pressure source 33 of FIG. 3b, a pressure reduction phase at the pressure outlet 32 is achieved by the pressure reduction control valve 53 taking up its basic 0, i.e. its through-flow position, whereas the pressure supply control valve 52 is simultaneously held in its shut-off or basic position 0.

From the foregoing, it may be seen that an electronic control unit 47, in the embodiment of the controllable brake pressure source 33 of FIG. 3b, generates the necessary activation signals for the activation of the 2/2-way magnetic valves 51, 52 and 53 in the sequence and combination for correct control with respect to the control objective and can obtain these activation signals from precisely the same processing of the velocity and pressure inputs as the electronic control unit 47 which, in the embodiment of FIG. 3a, is provided for rotational speed control of the drive motor 41 of the pump 39. It is possible to dispense with the recirculation control valve 51, which only loads the pump to a scarcely appreciable extent in its basic position 0, in any case where the pump of the controllable brake pressure source 33 of FIG. 3b is not permanently driven but is only driven during brake actuations. For this situation, sufficient protection of the controllable brake pressure source 33 against overload is achieved by the pressure limiting valve 54 alone.

Figure 4:
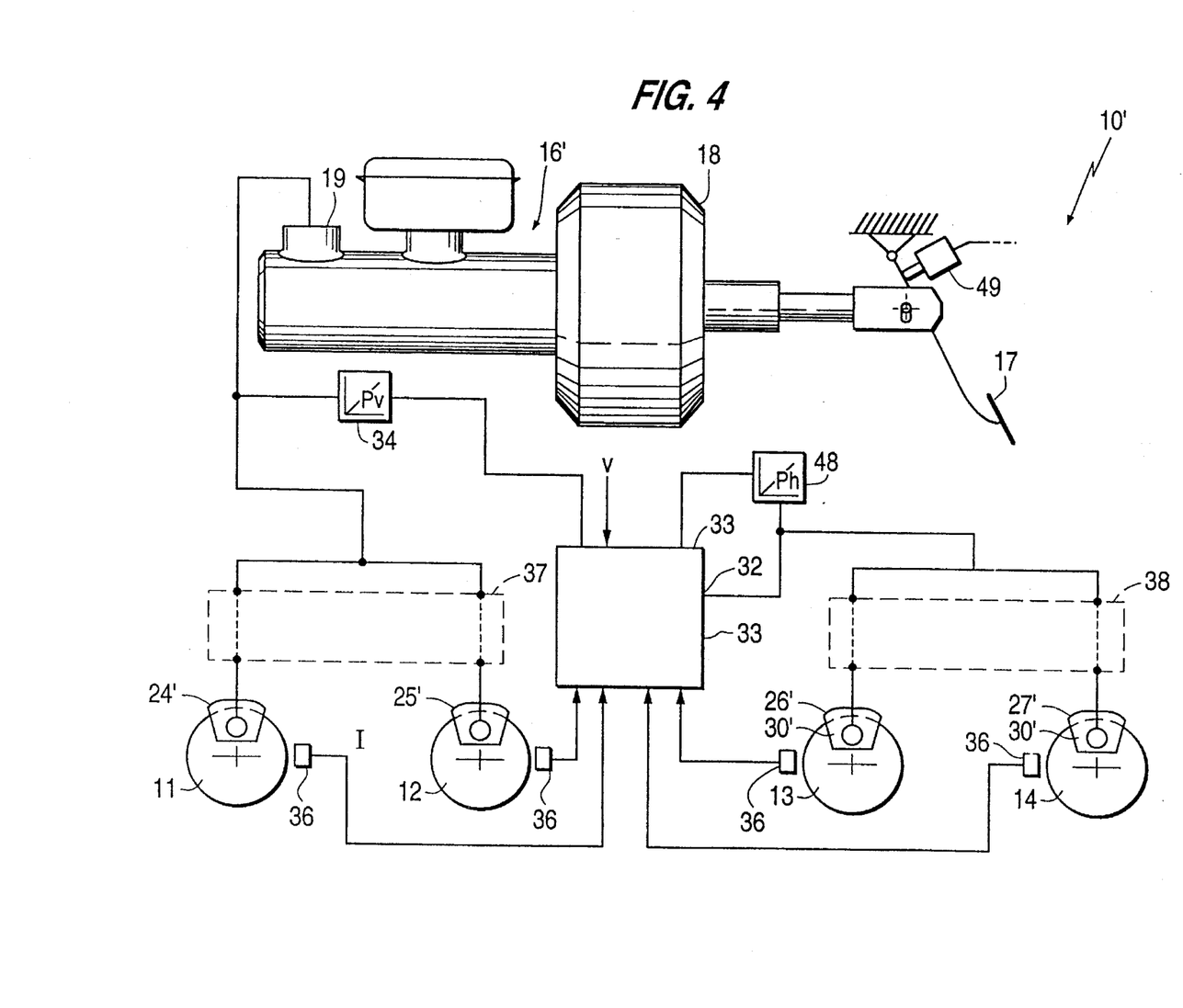
FIG. 4 is a schematic diagram similar to the brake system of FIG. 1, in which the rear wheel brakes are acted on exclusively by the outlet pressure of the controllable pressure source.

An electronically controlled brake pressure source 33, as explained by way of FIGS. 3a and 3b, can also be used in a brake system 10' as shown in FIG. 4, to which reference is now made, for the exclusive control of the rear axle braking force, taking into account the downward aerodynamic forces effective on the vehicle.

The elements of the brake system 10' shown in FIG. 4 are provided with the same reference numerals as the elements of the brake system 10 shown in FIG. 1 to indicate the identically or analogically equivalent nature of the structure and function of these elements and also indicates the reference to the descriptive parts provided in the description of FIG. 1 above.

As a departure from the embodiment of FIG. 1, a simple "single-circuit" main cylinder is provided as the brake unit 16' in the brake system 10' of FIG. 4. This "single-circuit" main cylinder has only one single pressure outlet 19 which is associated with the front axle brake circuit I and by way of which the brake pressure is connected into the brake calipers 24' and 25' of the two front wheel brakes 11 and 12. The brake calipers 24' and 25' are configured as simple twin-piston calipers whose piston area expediently corresponds to the sum of the piston areas of the piston pairs 28 and 29 of the embodiment of FIG. 1. Such twin-piston brake calipers 24' and 25' could also be employed in the brake system 10 of FIG. 1 for the front wheel brakes 11 and 12.

The brake calipers 26' and 27' of the respective rear wheel brakes 13 and 14 of the brake system 10', in which the rear wheel brakes 13 and 14 are exclusively acted on by the pressure delivered at the pressure outlet 32 of the controllable brake pressure source 33, are also configured as simple twin-piston calipers, each of which has only one piston pair 30'.

Using the vehicle data $\psi$, $\chi$, $G_g$, $K_{a,v}$ and $K_{a,h}$ employed in the explanation of an embodiment of the brake system 10 of FIG. 1, the relationship (11) applies and, for the optimum braking force distribution factor $DB_{om}$, the relationship (12), as developed using the embodiment of FIG. 1 and represented in FIG. 2a and 2b, taking account of the requirement for the optimum rear axle braking force proportion $\phi_{om}$ corresponding to the relationship (8) and taking account of the downward aerodynamic forces.

On the basis of the generally valid relationship $$DB = \frac{F_{Bh}}{F_{Bv}} = \frac{B_h^* \times P_h}{B_v^* \times P_v} \quad (10a')$$

in which $B^*_v$ and $B^*_h$ are given by the relationships $$B_v^* = \frac{2}{r_{dyn,v}} \times A_v \times r_{med,v} \times C_v^* \quad (17')$$

and $$B_h^* = \frac{2}{r_{dyn,h}} \times A_h \times r_{med,h} \times C_h^* \quad (18')$$

the following relationship applies:

$$DB = \frac{r_{dyn,v} \times A_h \times r_{med,h} \times C_h^* \times p_h}{r_{dyn,h} \times A_v \times r_{med,v} \times C_v^* \times p_v} \quad (21)$$

where $A_v$ represents the areas on which pressure can act of the piston pairs of the front wheel brake calipers 24' and 25', and $A_h$ represents the effective piston areas of the piston pairs 30' of the brake calipers 26' and 27" of the rear wheel brakes 13 and 14. Assuming the same configuration for the front wheel brakes 11 and 12 and the rear wheel brakes 13 and 14 but different values of the dynamic rolling radii $r_{dyn,v}$ and $r_{dyn,h}$ of, for example, 31 cm and 35.5 cm, the dynamic rolling radius $r_{dyn,h}$ being the larger, the following relationship is obtained by using the optimum value $DB_{om}$ of the braking force distribution factor in accordance with the relationship (12) for the pressure $p_h$ to be provided by the controllable brake pressure source 33 and to be fed into the brake calipers 26' and 27' of the rear wheel brakes 13 and 14:

$$p_h = DB_{om} \times \frac{r_{dyn,h}}{r_{dyn,v}} \times p_v = [0,85 - 0,42(\mu_B - 1) + 0,0032 \times V] \times \quad (22)$$

$$\frac{r_{dyn,h}}{r_{dyn,v}} \times p_v$$

For a friction coefficient $\mu_B$ of 1.5 and a vehicle speed value $\underline{v}$ of 60 m/s and using the values given of the dynamic rolling radii of the front wheels and the rear wheels of the vehicle, an evaluation of the relationship (22) gives:

$$p_h = (0,85 - 0,42 \times 0,5 + 0,0032 \times 60) \times \frac{35,5}{31} \times p_v \quad (22')$$

Taking account of the value in accordance with relationship (20) which also has to be employed in the case of the brake system 10' for the front axle brake pressure, the following value is obtained, in the assumed example, for the rear axle brake pressure $p_h$ which has to be connected into the rear wheel brakes 13 and 14:

$$0.73 \cdot 782.6 N/cm^2 = 571 N/cm^2$$

Figure 5:
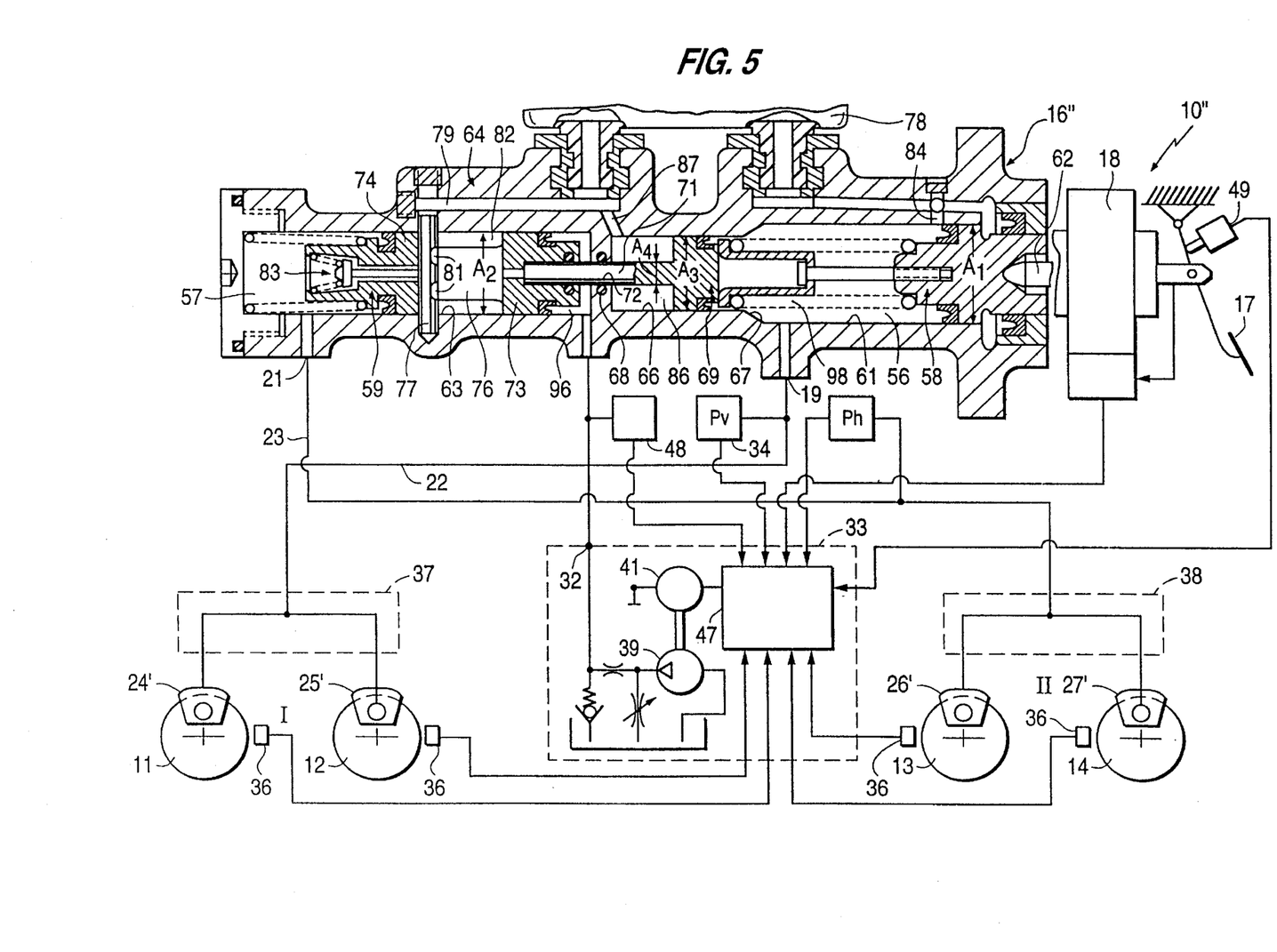
FIG. 5 is a schematic diagram of a further embodiment of a functional brake system corresponding to the brake system of FIG. 1, in which a tandem main cylinder which can be set to different braking force distributions, with the tandem main cylinder being shown in longitudinal section.

The brake system 10" shown in FIG. 5, to which reference is now made, also operates on the principle of optimizing the braking force distribution factor in accordance with the relationship (10), taking account of the optimum rear axle braking force proportion in accordance with the relationship (9), which follows from the condition (8).

The elements of the brake system 10" shown in FIG. 5 are provided with the same reference signs as the elements of the brake system 10 or 10' shown in FIGS. 1 and 4 to again signify identity and/or analogy of the construction and function of the elements identically designated in this manner and also to indicate the descriptive parts relevantly provided with respect to FIG. 1 and 4, even if these elements are not themselves explained in the description of FIG. 5.

The brake system 10" of FIG. 5 is, on one hand, similar to the brake system 10 of FIG. 1 to the extent that the brake unit 16" is configured as a tandem main cylinder which has a primary outlet pressure space 56, to whose pressure outlet 19 are connected the front wheel brakes 11 and 12 via the main brake conduit 22 and brake conduit branches emerging from the latter, and a secondary outlet pressure space 57 to whose pressure outlet 21 are connected the two rear wheel brakes 13 and 14 via the main brake conduit 22 and brake conduit branches emerging from the latter.

The brake system 10" of FIG. 5 is, on the other hand, similar to the brake system 10' of FIG. 4 to the extent that also in the case of the brake system 10" of FIG. 5, the brake calipers 24' and 25' of the front wheel brakes 11 and 12 and the brake calipers 26' and 27' of the rear wheel brakes 13 and 14 can be configured as "simple" twin-piston calipers.

Similarity to or analogy with the brake systems 10 and 10" explained in FIGS. 1 and 4 also exists to the extent that an electronically controllable pressure-source 33 influencing the rear axle brake pressure can be realized with either the configuration represented in FIG. 3a or the configuration represented in FIG. 3b, even if, for explanation purposes only, a representation corresponding to FIG. 3a is selected for the pressure source 33 in FIG. 5.

The configuration of the brake unit 16" as a tandem main cylinder of special type is, however, different relative to the brake systems 10 and 10'. This special type of tandem main cylinder is explained in detail below.

The tandem main cylinder 16" is configured as a so-called stepped main cylinder in which the one primary piston 58 forming the axially movable boundary of its primary outlet pressure space 56 and the one secondary piston 59 forming the axially movable boundary of a secondary outlet pressure space 57 have different cross-sectional areas $A_1$ and $A_2$, the cross-sectional area $A_1$ of the primary piston 58 being the larger.

A further central bore step 66 extends between the bore step 61, in which the primary piston 58 is guided in a pressure-tight and displaceable manner and the actuating force amplified by the braking force amplifier 18 acts on this primary piston 58 via a pressure rod 62, and the bore step 63 of the main cylinder housing, which is designated generally by numeral 64 and in which the secondary piston 59 forming the axially movable boundary of the secondary outlet pressure space 57 is guided in a pressure-tight and displaceable manner. The bore step 66 adjoins (via an annular shoulder 67) the bore step 61 forming the radial boundary, fixed relative to the housing, of the primary outlet pressure space 56, and is bounded relative to the bore step 63, in which the secondary piston 59 is guided in a pressure-tight and displaceable manner, by an intermediate wall 68 of the cylinder housing 64. An actuating piston 69 forming the inner, axially movable boundary of the primary outlet pressure space 56 is guided in this central bore step 66 in a pressure-tight and displaceable manner. The actuating piston 69 can be supported centrally on an inner piston flange 73 of the secondary piston 59 by a slender, axial push-rod 71 which passes through the central hole 72 of the intermediate wall 68 of the main cylinder housing 64 in a pressure-tight and displaceable manner. The "outer" piston flange 74 of the secondary piston 59, which directly bounds the secondary outlet pressure space 57 is connected to the inner piston flange 73 by a slotted piston rod 76; a stop tube 77 fixed relative to the housing passes radially through the slot in the piston rod 76. This stop tube 77 is in communicating connection with a housing passage 79 leading to the brake fluid reservoir 78 and it is provided with openings 81 by way of which brake fluid can be transferred into the follow-up space 82 extending between the two piston flanges 73 and 74 of the secondary piston 59.

The flange 74 movably bounding the secondary outlet pressure space 57 is provided with a central valve, indicated generally by numeral 83, which is held in its open position by a stop effect between a push-rod of its valve body and the stop tube 77 in the illustrated basic position of the secondary piston 59, which position corresponds to the non-actuated condition of the brake system. Consequently, a pressure balance is possible between the secondary outlet pressure space 57 and the brake fluid reservoir 78 via the follow-up space 82. The central valve 83 reaches its closed position, in which the pressure build-up in the secondary outlet pressure space 57 occurs, after a small initial section of the brake pressure build-up stroke of the secondary piston 59. A balance hole 84 in communicating connection with the brake fluid reservoir 78 is provided for the corresponding pressure balance in the primary outlet pressure space 56 associated with the front axle brake circuit I. The opening of the balance hole 84 at the pressure-space end is freed in the basic position of the primary piston 58 corresponding to the non-actuated condition of the brake system 10" and is shut off from the primary outlet pressure space 56 after a small initial section of the brake pressure build-up stroke of the primary piston 58. Brake pressure can then be built up in the primary outlet pressure space 56 on further displacement of the piston 58.

The axial push-rod 71 of the actuating piston 69 passes through the annular space 86 which is axially fixed relative to the housing by the intermediate wall 68 of the housing 64 and which is bounded in an axially movable manner by the actuating piston 69. The annular cross-sectional area of the annular space 86 around the cross-sectional area $A_4$ of the axial push-rod 71 is smaller than the total cross-sectional area $A_3$ of the actuating piston 69. The pressure generated in the primary outlet pressure space 56 acts on the actuating piston 69 by way of this area $A_3$. This annular space 86 is permanently connected to the brake fluid reservoir 78 via a further housing passage 87 and is therefore kept unpressurized.

Figure 5A:
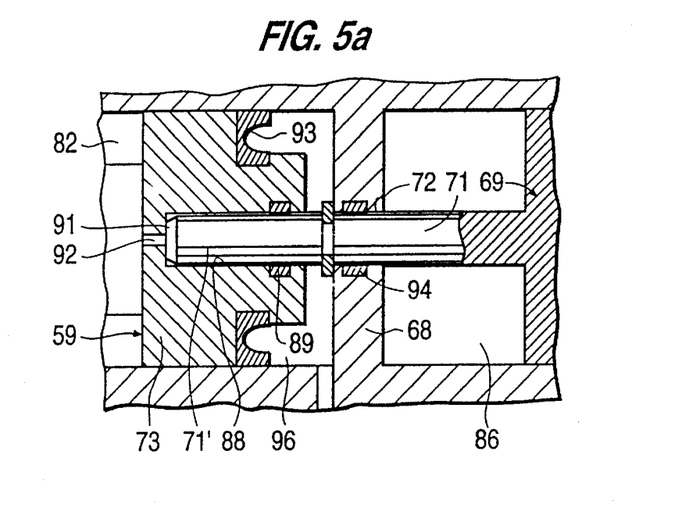
FIG. 5a is a partial enlarged cross-sectional view of the main cylinder of FIG. 5.

As can be best seen from FIG. 5a, the inner piston flange 73 of the secondary piston 59 is provided with a pocket hole 88, which is open towards the intermediate wall 68 of the housing 64 and in which the free end section 71' of the axial push-rod 71 of the actuating piston 69 is guided in a pressure-tight and displaceable manner. A ring seal 89 is arranged fixed relative to the piston on the end of the secondary piston flange 73 facing towards the intermediate wall 68 for the desired sealing between the push-rod 71, 71' and the secondary piston 59.

In the illustrated basic position of the secondary piston 59 and the actuating piston 69 shown in FIG. 5a, the end section 71' of the push-rod 71 is axially supported on the bottom 91 of the pocket hole 88. A central balance hole 82 of smaller diameter, via which brake fluid can follow up from the follow-up space 82 into the pocket hole 88 or can be displaced from the pocket hole 88 into the follow-up space 82 during relative motions bet-ween the secondary piston 59 and the actuating piston 69, opens into the pocket hole 88 of the inner piston flange 73 of the secondary piston 59. The annular space 96 is sealed against the follow-up space 82 in the radially inward direction by the ring seal 89 fixed relative to the piston and in the radially outward direction by a sealing collar 93 on the inner piston flange 73, which is sealed against the unpressurized annular space 86 by the ring seal 94 fixed relative to the housing and arranged within the central hole 72 of the intermediate wall 68 and through which the free end section 71' of the push-rod 71 of the actuating piston 69 passes axially. The annular space 96 is connected by a control connection 97 to the pressure outlet 32 of the electronically controllable brake pressure source 33 and therefore forms a control pressure space. When this control pressure space is acted on by the outlet pressure of the electronically controllable brake pressure source 33, the brake pressure, which can be connected into the rear wheel brakes 13 and 14 via the pressure outlet 21 of the secondary outlet pressure space 37 of the tandem main cylinder 16", can be controlled with the object, previously described, of optimizing the rear axle braking force proportion $\phi_{om}$.

The primary piston 58, the secondary piston 59 and the actuating piston 69 are forced by reset springs 98 and 99 into their basic positions marked by stop effect. The return spring 98 acting on the primary piston 58 acts on the actuating piston 69, whose basic position is therefore marked by its axial support on the bottom 91 of the pocket hole 88 of the secondary piston 59 whose basic position is in turn marked by rearward contact of its outer piston flange 74 on the stop tube 77; the reset spring 99 of the secondary piston 59 must be somewhat stronger than that of the primary piston 58.

The friction coefficient $\mu_B$, which can vary drastically due to the roadway relationships, the tire properties and the weather conditions and which is likewise important in the automatic setting of the front/rear axle braking force distribution in accordance with the relationship (9), (11) and (12), can thus be taken into account in the simplest configuration of the brake systems 10, 10' and 10" by providing the electronic control unit 47 of the additional pressure source 33 with an input device by way of which a suitable value can be input and changed, if necessary, by the driver during a race. If the vehicle is provided with an anti-lock brake system, automatic determination of the friction coefficient $\mu_B$ is possible by the driver executing a full braking operation in which the anti-lock control becomes effective on all the vehicle wheels so that, assuming that the same friction coefficient is effective at each vehicle wheel, this friction coefficient is equal to the vehicle deceleration factor Z arising from the control operation. This vehicle deceleration can be obtained, for example, from an evaluation of the output signal of the wheel rotational speed sensors 36 individually associated with the vehicle wheels.

Figure 6:
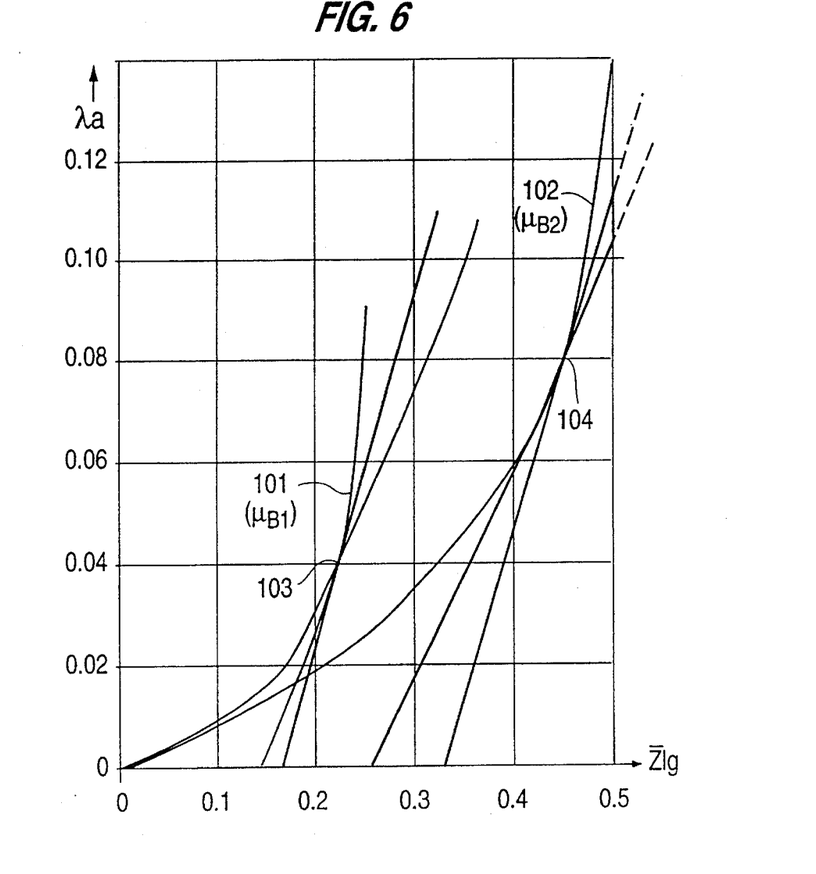
FIG. 6 is another diagram for explaining modification of the brake systems of FIGS. 1, 4 and 5.

Reference is now made to the diagram of FIG. 6 in order to explain a further possibility for dynamic determination of the friction coefficient $\mu_B$. When driving, this determination permits continuous setting of the electronic control unit 47 to the currently important friction coefficient $\mu_B$. In FIG. 6, the way in which the drive slip $\lambda_a$ depends on the propulsion acceleration (referred to the gravitational acceleration g) is plotted with different friction coefficients $\mu_{B1}$ and $\mu_{B2}$ as the parameter, the propulsion acceleration factor Z being plotted as the abscissa and, as the ordinate, the drive slip $\lambda_a$, which is given by the relationship $$\lambda_a = \frac{v_{ant}}{v_{ant} - v_f} \quad (23)$$

in which $v_{ant}$ is the wheel peripheral velocity of the driven vehicle wheels and $v_f$ is that of the free-running vehicle wheels. The $\lambda_a/Z$ curve 101, which rises steeply from the acceleration value of 0.2 and the slip value of 0.04, corresponds to a relatively low friction coefficient $\mu_{B1}$ whereas the $\lambda_a/Z$ curve 102, which rises steeply at the acceleration value of approximately 0.45 and the slip value of 0.08 corresponds to a relatively high friction coefficient $\mu_{b2}$. In these curves 101 and 102, those points 103 and 104 from which the steep rise of these curves 101 and 102 begins correspond to dynamic conditions at which, approximately, the maximum of the tangential force transmission capability between the accelerating vehicle wheels and the roadway is reached. For this condition, the following relationship applies to the traction force $F_{TH}$ which can be transmitted:

$$F_{TH} = \mu_B \cdot (\psi + \overline{Z} \cdot \chi) \cdot G_g \quad (24)$$

it being assumed that the vehicle has a rear-axle drive. Because $Z = F_{TH}/G$, it follows from this relationship (24) that the friction coefficient $\mu_B$ which can be employed is given by the relationship $$\mu_B = \overline{Z}/(\psi - \overline{Z} \cdot \chi) \quad (24')$$

in which the value to be inserted for Z corresponds to the particular "kink point" 103 or 104 of the respective curves 101 and 102. At these "kink points" 103 and 104, the curves 101 and 102 respectively have slopes $d\lambda_a/d\overline{Z}^\nabla$ between 0.4 and 0.6. The "kink points" 103 and 104 of the respective curves 101 and 102 can therefore be determined for various $\mu_B$ values from a continuous recording of the drive slip $\lambda_a$ and the vehicle acceleration $\overline{Z}$, from formation of the differential quotient $d\lambda_a/d\overline{Z}$ and from comparison of the same with threshold values between 0.4 and 0.6, which is readily possible by the electronic control unit 47. The $\mu_B$ values themselves are determined in accordance with the relationship (24') so that the continuous recording of the respectively valid $\mu_B$ value is possible.

The determination of the vehicle acceleration factor $\overline{Z}$ can be obtained by differential processing of output signals of the wheel rotational speed sensors 36 characteristic of the wheel rotational speeds or directly with the aid of a longitudinal acceleration sensor.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A brake system with variable braking force distribution between front and rear axles of a high speed vehicle in which downward aerodynamic forces on the vehicle cause an increase in axle loads as vehicle speed increases, wherein the increase in axle load is greater at the rear axle than at the front axle, comprising front wheel brakes, rear wheel brakes, a brake unit actuatable by a brake pedal and configured to generate at least a brake pressure in the front wheel brakes and operatively associated with the front wheel brakes and the rear wheel brakes that in the event of a specified defined limiting value of an actuation force exerted by a driver of the high speed vehicle, the vehicle has a magnitude of deceleration corresponding to complete utilization of frictional force on the braked vehicle wheels, and a separate pressure source comprising a braking force control device and providing a settable outlet pressure operatively associated between the brake unit and the rear wheel brakes so as to be directly connected as brake pressure into piston pairs of brake calipers of the rear wheel brakes, the source comprising an electronic control unit operatively configured to process at least one signal representative of the vehicle speed and one at least adjustably specifiable magnitude of a friction coefficient present at the vehicle wheels or assumed to be present and set, and to continuously form a value of an optimized braking force distribution factor in accordance with the following linear relationship $$DB_{om} = k_1 + k_2 \cdot \mu_B + k_3 \cdot v$$

in which $k_1$, $k_2$ and $k_3$ are vehicle-specific constants determined from linear interpolation of the manner in which $DB_{om}$ depends on v and $\mu_B$, where $DB_{om}$ is determined in accordance with the following relationship $$DB_{om} = \frac{\phi_{om}}{1 - \phi_{om}}$$

for different values of an optimized rear axle braking force proportion, $\phi_{om}$ which has different values determined from a numerical evaluation of the following relationship $$\phi_{om} = \frac{\psi - K_{a\,h} \times v^2/Gg - \mu_B \times \chi[1 - v^2(K_{a\,v} + K_{a\,h})/Gg]}{1 - v^2(K_{a\,v} + K_{a\,h})/Gg}$$

wherein $\psi$ represents the rear axle load proportion, $\chi$ represents the height of the vehicle center of gravity in relation to the wheel base, $K_{a,v}$ represents the aerodynamic upward or downward force coefficient at the front axle, $K_{a,h}$ represents the aerodynamic upward or downward force coefficient at the rear axle, $\mu_B$ represents the coefficient of friction, and $G_g$ represents the vehicle weight, and a sensor device operatively arranged between the brake unit and the pressure source such that, during a braking operation, a signal characteristic of an instantaneous value of front axle braking force, $F_{BV}$, is generated, wherein the controllable pressure source is operatively arranged to cause rear axle braking force, $F_{BH}$, to follow up the front axle braking force, $F_{BV}$, in accordance with the following relationship $$F_{BH} = DB_{om} \cdot F_{BV}.$$

2. The brake system according to claim 1, having a front/rear axle brake circuit division on which the front wheel brakes are jointly connected to an outlet pressure space of the brake unit in which static pressure can be generated as a brake pressure $p_v$, by actuation of the brake pedal, the rear wheel brakes are arranged to be acted on exclusively by the outlet pressure, $p_h$, of the controllable pressure source, and the outlet pressure, $p_h$, is caused to follow up the front axle brake pressure, $p_v$, in accordance with the relationship $$p_h = DB_{om} \cdot p_v \cdot r_{dyn,h} / r_{dyn,v}$$

wherein $r_{dyn,h}$ represents the dynamic rolling radius of the rear wheels, and $r_{dyn,v}$ represents the dynamic rolling radius of the front wheels of the vehicle.

3. The brake system according to claim 2, wherein the brake unit comprises a tandem main cylinder with an outlet pressure space associated with the front wheel brakes and an outlet pressure space associated with the rear wheel brakes, the rear wheel brakes have four-piston calipers of one configuration, each with two piston pairs of one or different configuration, the piston pairs of one brake caliper being connected together with one identically dimensioned piston pair of the other brake caliper via a respective common brake conduit, one brake conduit being connected to a brake unit pressure outlet, associated with the rear wheel brakes and another brake conduit being connected to a pressure outlet of the controllable pressure source.

4. The brake system according to claim 3, wherein the brake unit and cross-section of cylinders of the wheel brakes are configured to fixedly match for stable dynamic vehicle braking behavior over a braking range from partial braking range to full braking range.

5. The brake system according to claim 1, wherein the outlet pressure of the controllable pressure source is set by controlling rotational speed of an electric drive motor of a high-pressure pump.

6. The brake system according to claim 1, wherein the pressure source further comprises one of a pressure supply pump driven with a constant high rotational speed and a pressure reservoir kept at a high pressure level, and the rear axle brakes are selectively connectable thereto by pulse-controllable inlet and outlet valves.

7. The brake system according to claim 1, wherein the sensor device comprises at least one pressure pick-up to monitor brake pressure in the front wheel brakes and generate an output signal characteristic of the outlet pressure of the brake unit connectable into at least one of the front wheel brakes.

8. The brake system according to claim 1, wherein a position pick-up is provided to generate, as representative of the outlet pressure of the brake unit, an output signal characteristic of one of a pedal position and a position of the brake unit piston which is displaceable by the brake pedal.

9. The brake system according to claim 1, wherein a pressure pick-up is provided for recording an actual value of the pressure connected into the rear wheel brakes and is operatively connected to the pressure outlet of the pressure source.

10. The brake system according to claim 1, wherein a computer stage is operatively associated with the system to continuously evaluate wheel peripheral speeds and of at least one driven and one free-running vehicle wheel to form a signal characteristic of a parameter in which drive slip of the vehicle, $\lambda_a$, is given by the following relationship $$\lambda_a = (v_{ant} - v_f)/v_{ant}$$

where $v_{ant}$ is the driven wheel velocity, and $v_f$ is the free-running wheel velocity, and vehicle longitudinal acceleration is represented by z and, for values of the parameter $d\lambda_a/dz$, which are located within a range between 0.4 and 0.6, and to determine the friction coefficient, $\mu_B$, associated with values of the vehicle longitudinal acceleration z in accordance with the following relationship $$\mu_B = Z/(\psi - Z_x)$$

the friction coefficient, $\mu_B$, being applied by the computer stage to determine the optimum rear axle braking force proportion, $\phi_{om}$, and the optimized braking force distribution factor, $DB_{om}$, and thereby provided optimized braking force distribution to the high speed vehicle.

11. The brake system according to claim 1, wherein the vehicle is equipped with an anti-lock brake system for stable dynamic deceleration behavior, and a vehicle deceleration $Z_{ABS}$, in relation to the gravitational constant, g, which equals 9.81 m/s$^2$, which occurs with a response of the anti-lock brake system on all vehicle wheels, is applied as the friction coefficient, $\mu_B$, used for the determination of the optimum braking force distribution factor, $DB_{om}$.

12. The brake system according to claim 1, wherein the vehicle is equipped with a longitudinal acceleration sensor arranged to generate electrical output signals characteristic of at least one of accelerations and decelerations occurring on the vehicle.

13. A brake system with variable axle braking force distribution between front and rear axles of a high speed vehicle in which downward aerodynamic forces on the vehicle cause an increase in axle loads as vehicle speed increases, wherein the increase in axle load is greater at the rear axle than at the front axle, comprising front wheel brakes, rear wheel brakes, a brake unit, actuatable by a brake pedal and configured to generate at least a brake pressure connectable into the front wheel brakes, and operatively connected with the front and rear wheel brakes such that in the event of a specified defined limiting value of an actuation force exerted by a driver of the high speed vehicle, the vehicle has a deceleration of a magnitude corresponding to complete utilization of frictional force on the braked vehicle wheels, a separate pressure source comprising a braking force control device with an electrically controllable outlet pressure connectable into a control pressure space of the brake unit and thereby additively superimposed on brake pressure generatable by actuation of the pedal alone, which brake pressure is connectable into the rear wheel brakes, the pressure source comprising an electronic control unit operatively configured to process at least one signal representative of the vehicle speed and one at least adjustably specifiable magnitude of a friction coefficient present at the vehicle wheels or assumed to be present and set, and to continuously form a value of an optimized braking force distribution factor in accordance with the linear relationship $$DB_{om} = k_1 + k_2 \cdot \mu_B + k_3 \cdot v$$

in which $k_1$, $k_2$ and $k_3$ are vehicle-specific constants determined from linear interpolation of the manner in which $DB_{om}$ depends on v and $\mu_B$, where $DB_{om}$ is determined in accordance with the following relationship $$DB_{om} = \frac{\phi_{om}}{1 - \phi_{om}}$$

for different values of an optimized rear axle braking force proportion, $\phi_{om}$, which has different values determined from a numerical evaluation of the following relationship $$\phi_{om} = \frac{\psi - K_{ah} \times v^2/Gg - \mu_B \times \chi[1 - v^2(K_{av} + K_{ah})/Gg]}{1 - v^2(K_{av} + K_{ah})/Gg}$$

wherein $\psi$ represents the rear axle load proportion, $\chi$ represents the height of the vehicle center of gravity in relation to the wheel base, $k_{a,v}$ represents the aerodynamic upward or downward force coefficient at the front axle, $k_{a,h}$ represents the aerodynamic upward or downward force coefficient at the rear axle, $\mu_B$ represents the coefficient of friction, and $G_g$ represents the vehicle weight, and a sensor device operatively arranged between the brake unit and the pressure source such that, during a braking operation, a signal characteristic of an instantaneous value of front axle braking force, $F_{BV}$, is generated, and the pressure source is operatively arranged to cause the rear axle braking force, $F_{BH}$, to follow up the front axle braking force, $F_{BV}$, in accordance with the following relationship $$F_{BH} = DB_{om} \cdot F_{BV}.$$

14. The brake system according to claim 13, wherein the brake unit comprises a tandem main cylinder in which the front wheel brakes are connected to a primary outlet pressure space thereof and the rear wheel brakes are connected to a secondary outlet pressure space thereof, a housing of the tandem main cylinder having a first bore step forming a boundary fixed to a housing of the secondary outlet pressure space and being bounded therein by an outer piston flange of a secondary piston relative to an unpressurized follow-up space which is movably sealed by an inner piston flange against an inner section of the bore step and which is bounded by an intermediate wall of the housing against a central bore step beginning at a second bore step accommodating a primary piston, a cross-sectional area $A_1$ of the second bore step being somewhat larger than a cross-sectional area $A_3$ of the central bore step, an actuating piston is guidably displaceably arranged in a pressure-tight manner in the central bore step and forms an axially movable, inner boundary between the primary outlet pressure space and an unpressurized follow-up space axially bounded by the intermediate wall connected to the housing, the actuating piston having a push-rod configured axially to penetrate the central follow-up space and displaceably to pass through a central hole of the intermediate wall in a pressure-tight manner and further configured to be axially supportable on the inner piston flange of the secondary piston, and the annular space, which is axially movably bounded by the inner piston flange of the secondary piston and axially fixed relative to the housing by the intermediate wall and which is penetrated at a central region thereof by the push-rod, is connected to the pressure outlet of the controllable pressure source.

15. The brake system according to claim 14, wherein an end section of the push rod, acting on the secondary piston is displaceably arranged in a pressure-tight manner in a pocket hole of the secondary piston and is supportable on a bottom portion of the pocket hole.

16. The brake system according to claim 15, wherein the inner piston flange of the secondary piston is provided with a balance hole opening into the pocket hole centrally at the bottom portion to connect the pocket hole with the follow-up space.

17. A method for providing variable braking force distribution between front and rear axles of a high speed vehicle in which downward aerodynamic forces on the vehicle cause an increase in axle loads as vehicle speed increases, with the increase in axle load being greater at the rear axle than at the front axle, comprising the steps of generating a brake pressure in front wheel brakes of the vehicle processing at least one signal representative of the vehicle speed and one at least adjustably specifiable magnitude of an actual or assumed friction coefficient to continuously form an optimized braking force distribution factor value in accordance with the following linear relationship $$DB_{om} = k_1 + k_2 \cdot \mu_B + k_3 \cdot v$$

in which $k_1$, $k_2$ and $k_3$ are vehicle-specific constants determined from linear interpolation based on a relationship between $DB_{om}$ and v and $\mu_B$, where $DB_{om}$ is determined in accordance with the following relationship $$DB_{om} = \frac{\phi_{om}}{1 - \phi_{om}}$$

for different values of an optimized rear axle braking force proportion, $\phi_{om}$, which has different values determined from a numerical evaluation of the following relationship $$\phi_{om} = \frac{\psi - K_{ah} \times v^2/Gg - \mu_B \times \chi[1 - v^2(K_{av} + K_{ah})/Gg]}{1 - v^2(K_{av} + K_{ah})/Gg}$$

wherein $\psi$ represents the rear axle load proportion, $\chi$ represents the height of the vehicle center of gravity in relation to the wheel base, $k_{a,v}$ represents the aerodynamic upward or downward force coefficient at the front axle, $k_{a,h}$ represents the aerodynamic upward or downward force coefficient at the rear axle, $\mu_B$ represents the coefficient of friction, and $G_g$ represents the vehicle weight, and during a braking operation, generating a signal characteristic of an instantaneous front axle braking force, $F_B$, to cause a controllable pressure source to provide a rear axle braking source, $F_{BH}$, for rear wheel brakes in accordance with the relationship $$F_{BH}=DB_{om} \cdot F_{BV}$$

whereby, in the event of a specified defined limiting value of actuation force exerted by a vehicle driver on a brake pedal of the vehicle, the vehicle decelerates with utilization of substantially all frictional force on the braked vehicle wheels.

18. The method according to claim 17, wherein the provision of the rear axle braking force, $F_{BH}$, comprises the step of utilizing exclusively outlet pressure, $p_h$, of the controllable pressure source for the rear wheel brakes in accordance with the relationship $$p_h=DB_{om} \cdot p_v \cdot r_{dyn,h}/r_{dyn,v}$$

wherein $r_{dyn,h}$ represents the dynamic rolling radius of the rear wheels, and $r_{dyn,v}$ represents the dynamic rolling radius of the front wheels of the vehicle.

* * * * *